US009693383B2

United States Patent
Lee et al.

(10) Patent No.: US 9,693,383 B2
(45) Date of Patent: Jun. 27, 2017

(54) DRX OPERATION IN A WIRELESS COMMUNICATION SYSTEM

(71) Applicant: LG ELECTRONICS INC., Seoul (KR)

(72) Inventors: Sunyoung Lee, Anyang-si (KR); Sungjun Park, Anyang-si (KR); Seungjune Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 74 days.

(21) Appl. No.: 14/416,591

(22) PCT Filed: Oct. 18, 2013

(86) PCT No.: PCT/KR2013/009333
§ 371 (c)(1),
(2) Date: Jan. 22, 2015

(87) PCT Pub. No.: WO2014/084503
PCT Pub. Date: Jun. 5, 2014

(65) Prior Publication Data
US 2015/0189690 A1    Jul. 2, 2015

Related U.S. Application Data

(60) Provisional application No. 61/730,973, filed on Nov. 29, 2012.

(51) Int. Cl.
*H04W 76/04* (2009.01)
*H04W 76/00* (2009.01)

(52) U.S. Cl.
CPC ......... *H04W 76/048* (2013.01); *H04W 76/00* (2013.01); *H04W 76/04* (2013.01)

(58) Field of Classification Search
CPC ............................ H04W 76/048; H04W 76/04
See application file for complete search history.

(56) References Cited

U.S. PATENT DOCUMENTS

2009/0238098 A1    9/2009  Cai et al.
2009/0253470 A1   10/2009  Xu
(Continued)

FOREIGN PATENT DOCUMENTS

| CN | 102474350 | 5/2012 |
| CN | 102883417 | 1/2013 |

(Continued)

OTHER PUBLICATIONS

PCT International Application No. PCT/KR2013/009333, Written Opinion of the International Searching Authority dated Jan. 24, 2014, 10 pages.

(Continued)

*Primary Examiner* — Jae Y Lee
*Assistant Examiner* — Aixa Guadalupe-Cruz
(74) *Attorney, Agent, or Firm* — Lee Hong Degerman Kang & Waimey

(57) ABSTRACT

Discontinuous reception (DRX) operation in a wireless communication system is disclosed. According to this, when the UE received configuration information for a long discontinuous reception (DRX) cycle and a short DRX cycle from a network, and receive a data unit comprising at least one DRX command Medium Access Control (MAC) Control Element (CE) from the network, the UE starts using the long DRX cycle, if the data unit comprises two or more DRX command MAC CEs.

8 Claims, 10 Drawing Sheets

(56) References Cited

U.S. PATENT DOCUMENTS

| | | | |
|---|---|---|---|
| 2011/0002281 A1* | 1/2011 | Terry | H04W 52/0216 370/329 |
| 2011/0292851 A1 | 12/2011 | Fong et al. | |
| 2012/0069782 A1* | 3/2012 | Kuo | H04W 76/048 370/311 |
| 2012/0140691 A1 | 6/2012 | Wu | |

FOREIGN PATENT DOCUMENTS

| | | |
|---|---|---|
| EP | 1944985 | 7/2008 |
| WO | 2009/114802 | 9/2009 |

OTHER PUBLICATIONS

State Intellectual Property Office of the People's Republic of China Application Serial No. 201380044437.9, Office Action dated Feb. 4, 2017, 19 pages.

* cited by examiner

FIG. 3
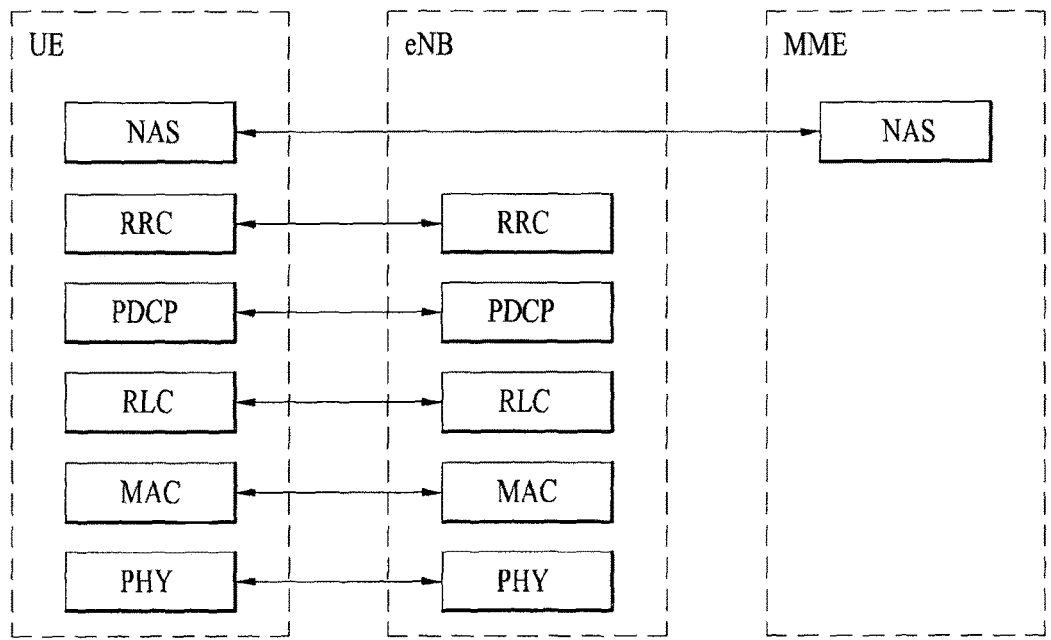
(a) contol - plane protocol stack
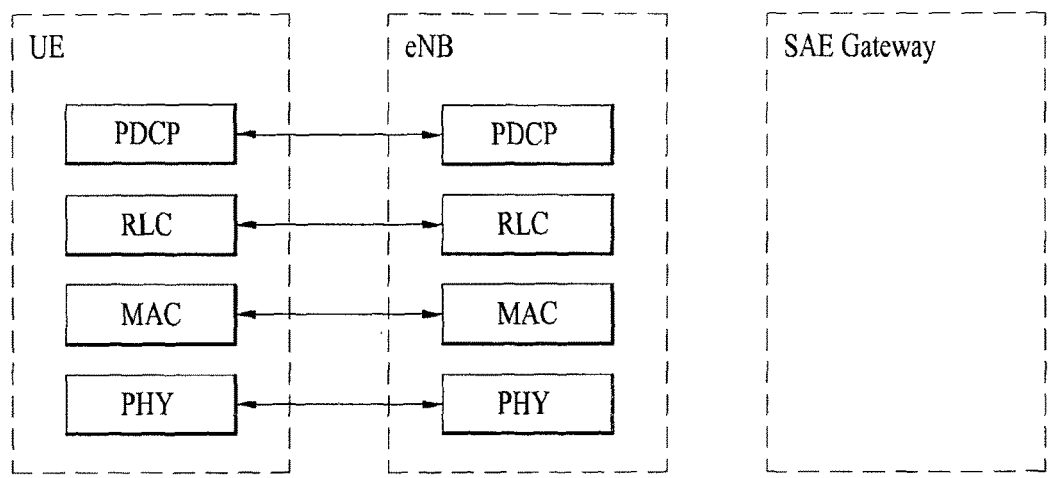
(b) user - plane protocol stack

DRX OPERATION IN A WIRELESS COMMUNICATION SYSTEM

CROSS-REFERENCE TO RELATED APPLICATIONS

This application is the National Stage filing under 35 U.S.C. 371 of International Application No. PCT/KR2013/009333, filed on Oct. 18, 2013, which claims the benefit of U.S. Provisional Application Ser. No. 61/730,973, filed on Nov. 29, 2012, the contents of which are hereby incorporated by reference herein in their entirety.

TECHNICAL FIELD

The present invention relates to a wireless communication system, and more particularly, to methods for a DRX (discontinuous reception) operation based on specific signaling scheme and apparatuses therefor.

BACKGROUND ART

As an example of a wireless communication system to which the present invention is applicable, a 3rd generation partnership project (3GPP) long term evolution (LTE) communication system will be schematically described.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE

Technical Problem

Accordingly, the present invention is directed to methods for DRX operating with specific signaling scheme and apparatuses therefor that substantially obviates one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for a user equipment (UE) to operate in a wireless communication system, the method comprising: receiving configuration information for a long discontinuous reception (DRX) cycle and a short DRX cycle from a network; receiving a data unit comprising at least one DRX command Medium Access Control (MAC) Control Element (CE) from the network; and using the long DRX cycle, when said data unit comprises two or more DRX command MAC CEs, is provided.

The method may further comprises using the short DRX cycle, when said data unit comprises one DRX command MAC CE.

The above using the short DRX cycle may comprise starting a DRX short cycle timer, and the UE may use the long DRX cycle after the DRX short cycle timer expires.

If the UE receives the data unit comprising two or more DRX command MAC CEs while using the short DRX cycle, the UE may use the long DRX cycle.

And, the data unit may be a MAC Protocol Data Unit (PDU).

In another aspect of the present invention, a user equipment (UE) for operating in a wireless communication system, the UE comprising: a transceiver configured to receive configuration information for a long discontinuous reception (DRX) cycle and a short DRX cycle; and a processor connected to the transceiver and adapted to use the long DRX cycle, when a data unit comprising at least one DRX command Medium Access Control (MAC) Control Element (CE) is received through the transceiver and said data unit is determined to comprise two or more DRX command MAC CEs, is provided.

The processor may be further adapted to use the short DRX cycle, when said data unit is determined to comprise one DRX command MAC CE.

The processor may start a DRX short cycle timer when the short DRX cycle is used, and the processor may use the long DRX cycle after the DRX short cycle timer expires.

If the transceiver receives the data unit comprising two or more DRX command MAC CEs while the processor use the short DRX cycle, the processor may use the long DRX cycle.

The data unit may be a MAC Protocol Data Unit (PDU).

In another aspect of the present invention, a method for a network to operate in a wireless communication system, the method comprising: transmitting configuration information for a long discontinuous reception (DRX) cycle and a short DRX cycle to a user equipment (UE); and transmitting a data unit comprising at least two DRX command Medium Access Control (MAC) Control Elements (CEs) to the UE to make the UE use the long DRX cycle, is provided.

In another aspect of the present invention, a network apparatus for operating in a wireless communication system, the apparatus comprising: a transceiver configured to transmit configuration information for a long discontinuous reception (DRX) cycle and a short DRX cycle; and a processor connected to the transceiver and adapted to control the transceiver to transmit a data unit comprising at least two DRX command Medium Access Control (MAC) Control Elements (CEs) to the UE when the processor determined to make the UE use the long DRX cycle, is provided.

Advantageous Effects

According to embodiments of the present invention, the network and the user equipment can efficiently transmit and receive signals in a wireless communication system.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 3 is a diagram showing a control plane and a user plane of a radio interface protocol between a UE and an E-UTRAN based on a 3rd generation partnership project (3GPP) radio access network standard.

BEST MODE

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
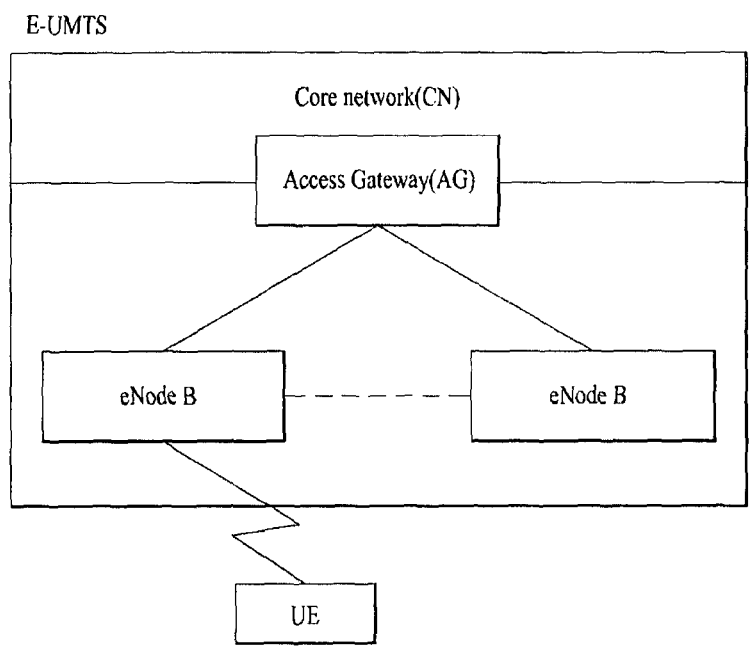
FIG. 1 is a diagram showing a network structure of an Evolved Universal Mobile Telecommunications System (E-UMTS) as an example of a wireless communication system.
Figure 2:
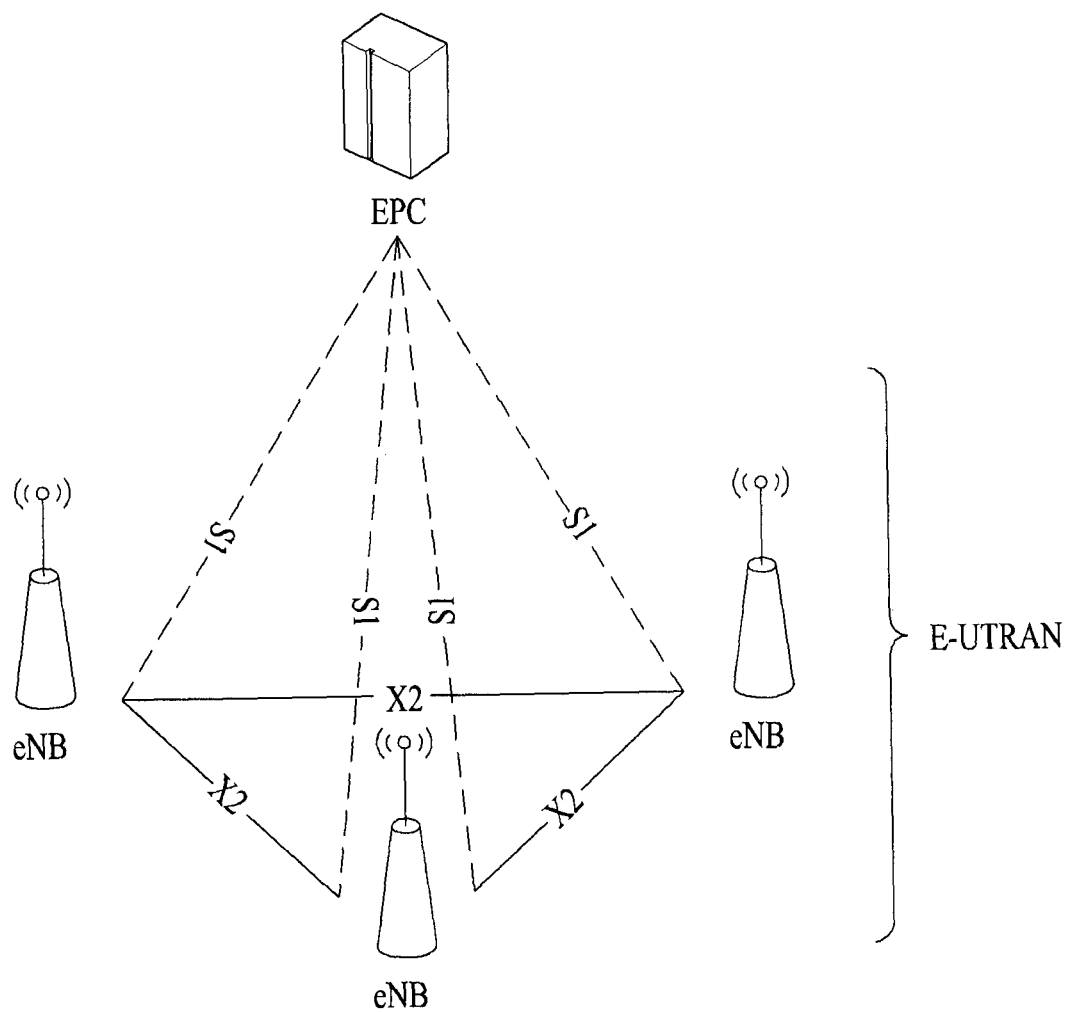
FIG. 2 is a diagram conceptually showing a network structure of an evolved universal terrestrial radio access network (E-UTRAN).

FIG. 2 is a diagram conceptually showing a network structure of an evolved universal terrestrial radio access network (E-UTRAN). An E-UTRAN system is an evolved form of a legacy UTRAN system. The E-UTRAN includes cells (eNB) which are connected to each other via an X2 interface. A cell is connected to a user equipment (UE) via a radio interface and to an evolved packet core (EPC) via an S1 interface.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4:
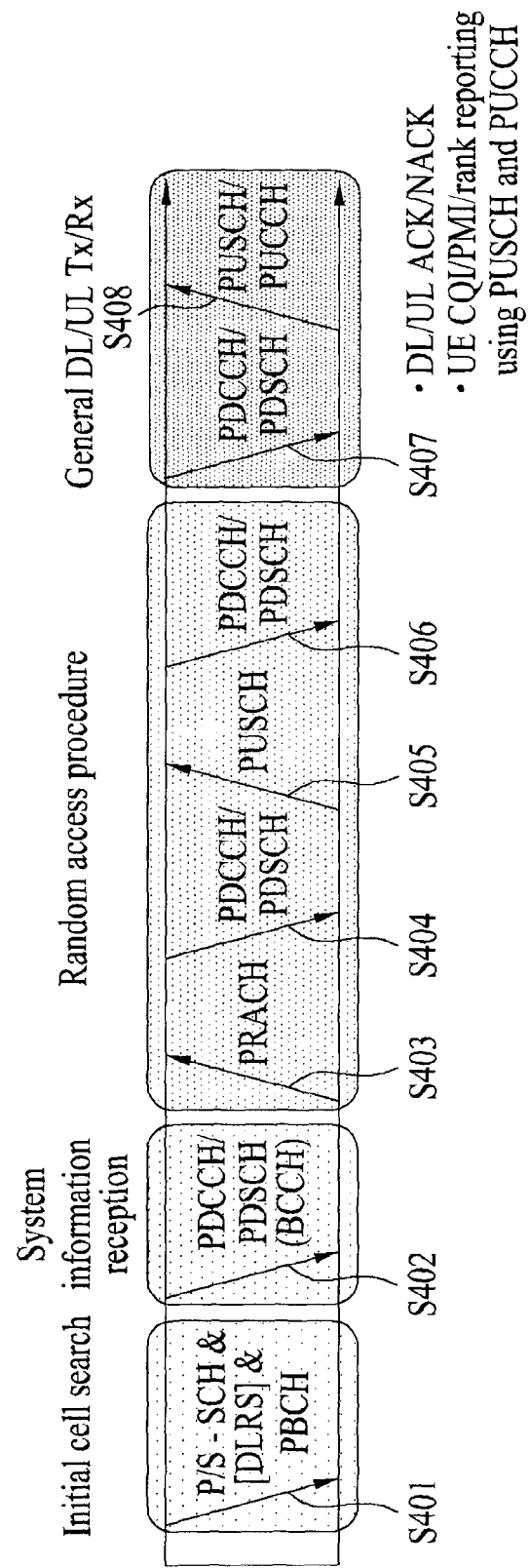
FIG. 4 is a diagram showing physical channels used in a 3GPP system and a general signal transmission method using the same.

FIG. 4 is a diagram showing physical channels used in a 3GPP system and a general signal transmission method using the same.

When a UE is powered on or enters a new cell, the UE performs an initial cell search operation such as synchronization with an eNB (S401). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S402).

When the UE initially accesses the eNB or has no radio resources for signal transmission, the UE may perform a random access procedure (RACH) with respect to the eNB (steps S403 to S406). To this end, the UE may transmit a specific sequence as a preamble through a physical random access channel (PRACH) (S403) and receive a response message to the preamble through the PDCCH and the PDSCH corresponding thereto (S404). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S408), which is a general uplink/downlink signal transmission procedure. Particularly, the UE received downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 5:
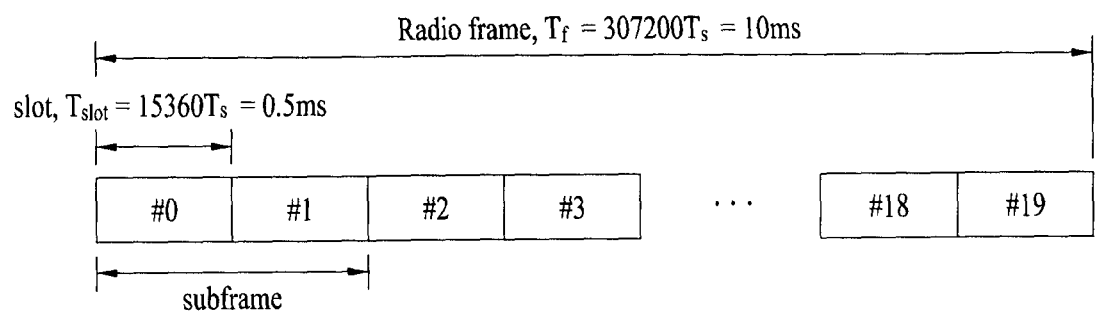
FIG. 5 is a diagram showing the structure of a radio frame used in a Long Term Evolution (LTE) system.

FIG. 5 is a diagram showing the structure of a radio frame used in an LTE system.

Referring to FIG. 5, the radio frame has a length of 10 ms ($327200 \times T_s$) and is divided into 10 subframes having the same size. Each of the subframes has a length of 1 ms and includes two slots. Each of the slots has a length of 0.5 ms ($15360 \times T_s$). Ts denotes a sampling time, and is represented by $T_s = 1/(15 \text{ kHz} \times 2048) = 3.2552 \times 10^{-8}$ (about 33 ns). Each of the slots includes a plurality of OFDM symbols in a time domain and a plurality of Resource Blocks (RBs) in a frequency domain. In the LTE system, one RB includes 12 subcarriers×7 (or 6) OFDM symbols. A transmission time interval (TTI) that is a unit time for transmission of data may be determined in units of one or more subframes. The structure of the radio frame is purely exemplary and thus the number of subframes included in the radio frame, the number of slots included in a subframe, or the number of OFDM symbols included in a slot may be changed in various ways.

Figure 6:
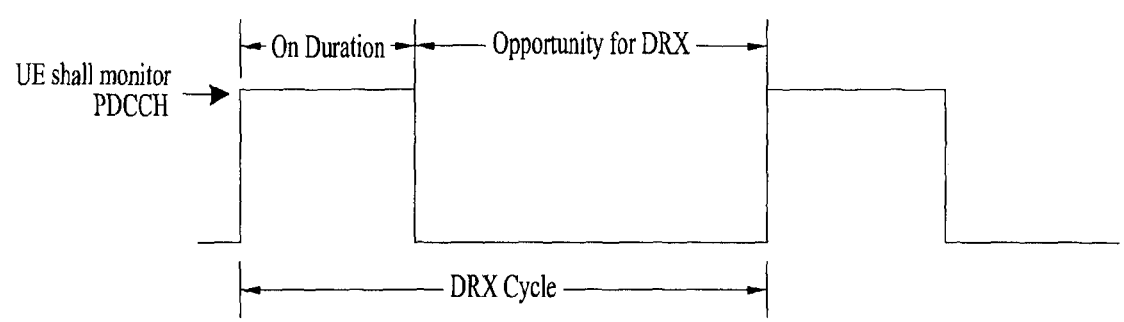
FIG. 6 is a diagram showing a concept DRX (Discontinuous Reception).

FIG. 6 is a diagram showing a concept DRX (Discontinuous Reception).

Referring to FIG. 6, if DRX is set for a UE in RRC_CONNECTED state, the UE attempts to receive a downlink channel, PDCCH, that is, performs PDCCH monitoring only during a predetermined time period, while the UE does not perform PDCCH monitoring during the remaining time period. A time period during which the UE should monitor a PDCCH is referred to as "On Duration". One On Duration is defined per DRX cycle. That is, a DRX cycle is a repetition period of On Duration.

The UE always monitors a PDCCH during On Duration in one DRX cycle and a DRX cycle determines a period in which On Duration is set. DRX cycles are classified into a long DRX cycle and a short DRX cycle according to the periods of the DRX cycles. The long DRX cycle may minimize the battery consumption of a UE, whereas the short DRX cycle may minimize a data transmission delay.

When the UE receives a PDCCH during On Duration in a DRX cycle, an additional transmission or a retransmission may take place during a time period other than the On Duration. Therefore, the UE should monitor a PDCCH during a time period other than the On Duration. That is, the UE should perform PDCCH monitoring during a time period over which an inactivity managing timer, drx-Inactivity- Timer or a retransmission managing timer, drx-RetransmissionTimer as well as an On Duration managing timer, onDurationTimer is running.

The value of each of the timers is defined as the number of subframes. The number of subframes is counted until the value of a timer is reached. If the value of the timer is satisfied, the timer expires. The current LTE standard defines drx-InactivityTimer as a number of consecutive PDCCH-subframes after successfully decoding a PDCCH indicating an initial UL or DL user data transmission and defines drx-RetransmissionTimer as a maximum number of consecutive PDCCH-subframes for as soon as a DL retransmission is expected by the UE.

Additionally, the UE should perform PDCCH monitoring during random access or when the UE transmits a scheduling request and attempts to receive a UL grant.

A time period during which a UE should perform PDCCH monitoring is referred to as an Active Time. The Active Time includes On Duration during which a PDCCH is monitored periodically and a time interval during which a PDCCH is monitored upon generation of an event.

More specifically, the Active Time includes the time while (1) on DurationTimer or drx-InactivityTimer or drx-RetransmissionTimer or mac-ContentionResolutionTimer is running, or (2) a Scheduling Request is sent on PUCCH and is pending, or (3) an uplink grant for a pending HARQ retransmission can occur and there is data in the corresponding HARQ buffer, or (4) a PDCCH indicating a new transmission addressed to the C-RNTI of the UE has not been received after successful reception of a Random Access Response for the preamble not selected by the UE.

Figure 7:
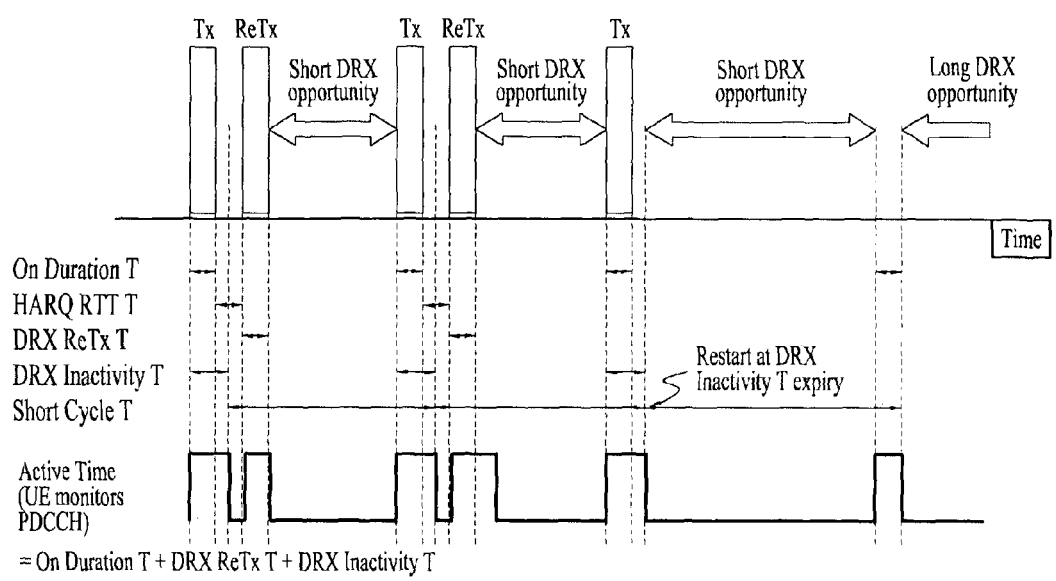
FIG. 7 is a diagram showing a method for a DRX operation in the LTE system.

FIG. 7 is a diagram showing a method for a DRX operation in the LTE system.

Referring to FIG. 7, the UE may be configured by RRC with a DRX functionality and shall perform following operations for each TTI (that is, each subframe).

If a HARQ RTT (Round Trip Time) Timer expires in this subframe and the data of the corresponding HARQ process was not successfully decoded, the UE shall start the drx-RetransmissionTimer for the corresponding HARQ process.

Further, if a DRX Command MAC control element (CE) is received, the UE shall stop on DurationTimer and drx-InactivityTimer. The DRX Command MAC CE is a command for shifting to a DRX state, and is identified by a LCID (Logical Channel ID) field of a MAC PDU (Protocol Data Unit) subheader.

Further, in case that drx-InactivityTimer expires or a DRX Command MAC CE is received in this subframe, if the Short DRX cycle is configured, the UE shall start or restart drxShortCycleTimer, and use the Short DRX Cycle. However, if the Short DRX cycle is not configured, the Long DRX cycle is used. Additionally, if drxShortCycleTimer expires in this subframe, the Long DRX Cycle is also used.

Furthermore, if the Short DRX Cycle is used and [(SFN*10)+subframe number] modulo (shortDRX-Cycle) is (drxStartOffset) modulo (shortDRX-Cycle), or if the Long DRX Cycle is used and [(SFN*10)+subframe number] modulo (longDRX-Cycle) is drxStartOffset, the UE shall start on DurationTimer.

The UE shall monitor the PDCCH for a PDCCH-subframe during the Active Time. If the PDCCH indicates a DL transmission or if a DL assignment has been configured for this subframe, the UE shall start the HARQ RTT Timer for the corresponding HARQ process and stop the drx-RetransmissionTimer for the corresponding HARQ process. If the PDCCH indicates a (DL or UL) new transmission, the UE shall start or restart drx-InactivityTimer.

Here, the PDCCH-subframe is defined as a subframe with PDCCH. That is, the PDCCH-subframe is a subframe on which the PDCCH can be transmitted. More specifically, in a FDD (frequency division duplex) system, the PDCCH-subframe represents any subframe. For full-duplex TDD (time division duplex) system, the PDCCH-subframe represents the union of downlink subframes and subframes including DwPTS of all serving cells, except serving cells that are configured with schedulingCellId (that is, the Scheduled cell). Here, the schedulingCellId indicates an identity of the scheduling cell. Further, for half-duplex TDD system, the PDCCH-subframe represents the subframes where the PCell (primary cell) is configured as a downlink subframe or a subframe including DwPTS.

Meanwhile, when not in Active Time, the UE does not perform a SRS (Sounding Reference Signal) transmission and a CSI reporting, which are triggered by the eNB.

During the above DRX operation, only the HARQ RTT Timer is fixed to 8 ms, whereas the eNB indicates the other timer values, on DurationTimer, drx-InactivityTimer, drx-RetransmissionTimer, and mac-ContentionResolutionTimer to the UE by an RRC signal. The eNB also indicates a long DRX cycle and a short DRX cycle, which represent the period of a DRX cycle, to the UE by an RRC signal.

As explained above, when the UE is configured with DRX, the UE saves power consumption by discontinuously monitoring the PDCCH for DL/UL transmission. The DRX operation is specified by the DRX-config IE in the RRC signalling, which includes on DurationTimer, drx-InactivityTimer, drx-RetransmissionTimer, drxStartOffset, shortDRX-cycle, and drxShortCycleTimer. In addition to the timers, the DRX operation is explicitly handled by the MAC signalling, i.e., a DRX Command MAC control element.

The DRX Command MAC control element is identified by a MAC PDU subheader with LCID as specified in table 1 below showing values of LCID for DL-SCH. The DRX Command MAC CE has a fixed size of zero bits.

TABLE 2

| Index | LCID values |
| --- | --- |
| 00000 | CCCH |
| 00001-01010 | Identity of the logical channel |
| 01011-11010 | Reserved |
| 11011 | Activation/Deactivation |
| 11100 | UE Contention Resolution Identity |
| 11101 | Timing Advance Command |
| 11110 | DRX Command |
| 11111 | Padding |

Upon receiving a DRX Command MAC control element in a MAC PDU, the UE starts using the Short DRX cycle and starts the drxShortCycleTimer if the UE is configured with the Short DRX cycle; otherwise the UE uses the Long DRX Cycle. Once the UE starts using the Short DRX cycle, the UE keeps using the Short DRX cycle and does not move to the Long DRX cycle unless the drxShortCycleTimer expires.

Considering the traffic and scheduling policy, for some cases, it would be desirable for the UE to use the Long DRX cycle even though the drxShortCycleTimer does not expire yet. For example, when the eNB has only a small data transmission and expects that there is no further data transmission to the UE, the UE can save power consumption by using the Long DRX cycle instead of continuing use of the Short DRX cycle until when the drxShortCycleTimer expires.

In the current specification, a single DRX Command MAC CE is included in a MAC PDU, and the DRX Command MAC CE only stops continuous reception and makes the UE to start using the Short DRX cycle. There is no method to stop using the Short DRX cycle until drx-ShortCycleTimer expires and makes the UE to start.

So, one embodiment of the present invention proposes that the number of the same control elements in one message indicates different control information.

For example, when a UE is configured with multiple DRX cycles, if the UE receives a MAC PDU including at least one DRX Command MAC CE, the UE sets the level of DRX cycle to be used according to the number of DRX Command MAC CEs in the MAC PDU.

In case a UE is configured with Short and Long DRX cycles, in order to make the UE to start using the Long DRX cycle, the eNB sends two DRX Command MAC CEs in the same MAC PDU. If the eNB wants to make the UE to start using Short DRX cycle, the eNB sends only one DRX Command MAC CE in the MAC PDU.

Specifically, when the eNB configures the DRX functionality to the UE, the eNB sends an RRC signalling, including the timers on DurationTimer, drx-InactivityTimer, drx-Retransmission Timer.

the longDRX-Cycle, the value of the drxStartOffset.

optionally, the drxShortCycleTimer and shortDRX-Cycle.

When the UE is configured with both of the Short DRX cycle and the Long DRX cycle, and when the UE receives a MAC PDU including the DRX Command MAC CE, the UE may stop on DurationTimer and drx-InactivityTimer.

And, according to the present embodiment, the UE checks how many DRX Command MAC CEs are included in the same MAC PDU. If the UE receives a single DRX Command MAC CE in a MAC PDU, the UE may start or restart drxShortCycleTimer, and uses the Short DRX cycle. Then, when drxShortCycleTimer expires, the UE uses the Long DRX cycle. On the other hand, if the UE receives two DRX Command MAC CEs in a MAC PDU, the UE may use the Long DRX cycle, even though drxShortCycleTimer does not expire.

Figure 8:
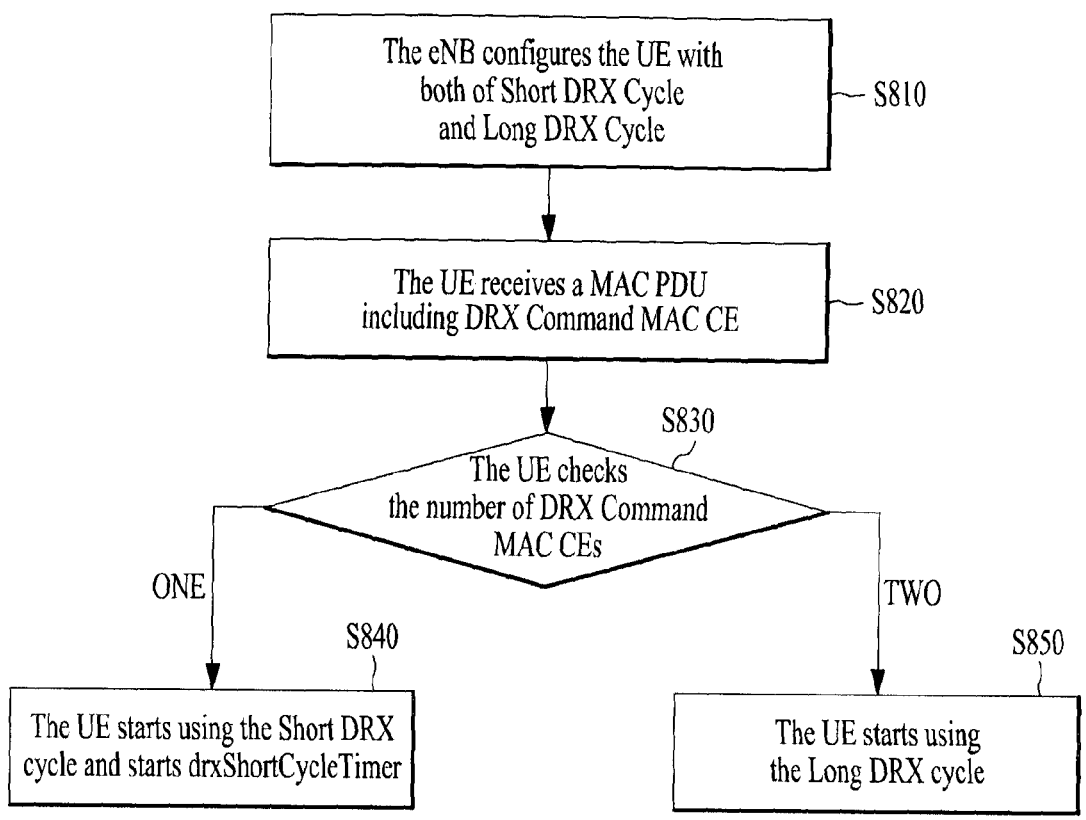
FIG. 8 shows a flowchart for explaining one embodiment of the present invention.

FIG. 8 shows a flowchart for explaining one embodiment of the present invention.

The present embodiment supposes an example when the eNB configures the UE with both of short DRX cycle and Long DRX cycle (S810). However, the present embodiment may not be limited to this situation. In this situation, the UE receives a MAC PDU including at least one DRX Command MAC CE (S820).

According to the present embodiment, the UE checks the number of DRX Command MAC CEs within the MAC PDU (S830). If the number of DRX Command MAC CEs is one, the UE starts using the short DRX cycle and starts drxShort-CYCLe Timer (S840). On the other hand, if the number of DRX Command MAC CEs is two or more, the UE may starts using the long DRX cycle (S850). Using the long DRX cycle is triggered even though drxShortCycleTimer does not expire.

Figure 9:
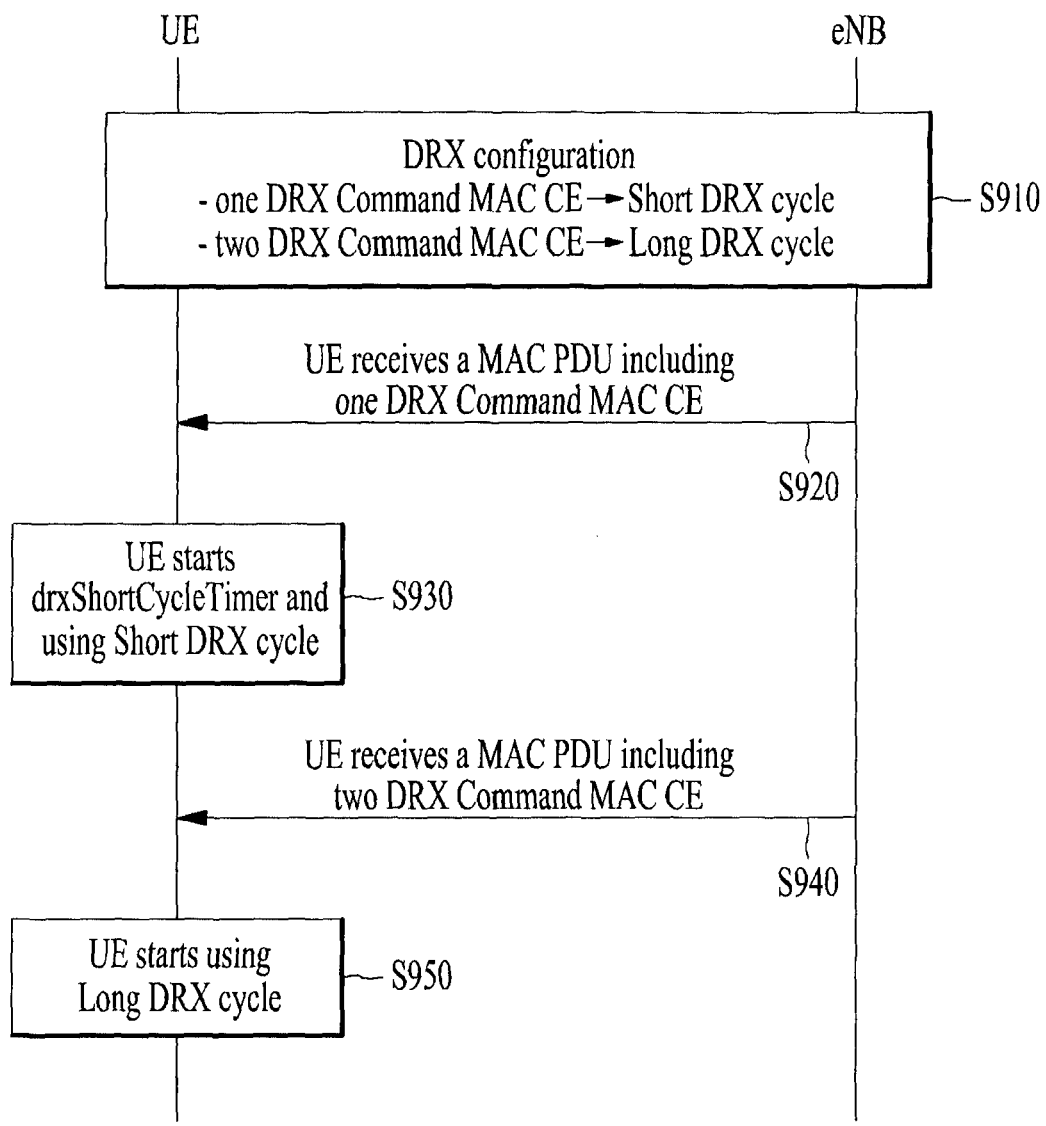
FIG. 9 shows a flowchart for explaining another embodiment of the present invention.

FIG. 9 shows a flowchart for explaining another embodiment of the present invention.

When the present invention is applied, the eNB may use this knowledge that if one DRX Command MAC CE is included within the MAC PDU, the UE may use short DRX cycle; and if two DRX Command MAC CEs are included within the MAC PDU, the UE may use long DRX cycle (S910).

At one instance, the UE may receive a MAC PDU including one DRX Command MAC CE (S920). In this case, UE may start drxShortCycleTimer and use Short DRX cycle (S930). While the UE uses the Short DRX cycle, when UE receives a MAC PDU including two DRX Command MAC CEs within one MAC PDU (S940), the UE may starts suing the Long DRX cycle (S950).

The above explanations are made with an example of MAC PDU as a data unit, and whether the MAC PDU includes one or two DRX Command MAC CEs is signaling method. However, a data unit other than the MAC PDU may be used to carry signaling information based on how many DRX Command MAC CEs are included within it.

Figure 10:
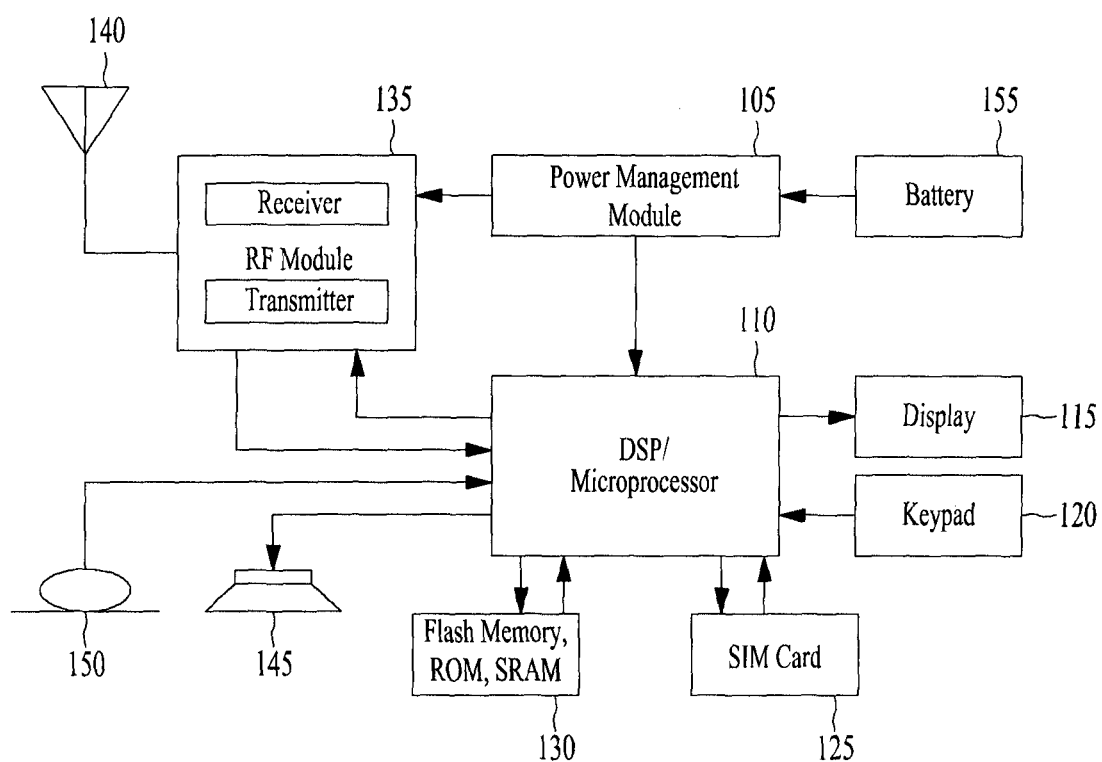
FIG. 10 is a block diagram of a communication apparatus according to an embodiment of the present invention.

FIG. 10 is a block diagram of a communication apparatus according to an embodiment of the present invention.

The apparatus shown in FIG. 10 can be a user equipment (UE) and/or eNB adapted to perform the above mechanism, but it can be any apparatus for performing the same operation.

As shown in FIG. 10, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 10 may represent a UE comprising a transceiver (135) configured to receive configuration information for a long discontinuous reception (DRX) cycle and a short DRX cycle. The processor (110) may be connected to the transceiver (135) and adapted to use the long DRX cycle, when a data unit comprising at least one DRX command Medium Access Control (MAC) Control Element (CE) is received through the transceiver (135) and the data unit is determined to comprise two or more DRX command MAC CEs.

When the apparatus represent a eNB, the eNB may comprises a transceiver (135) configured to transmit configuration information for a long discontinuous reception (DRX) cycle and a short DRX cycle. The processor (110) may be connected to the transceiver (135) and adapted to control the transceiver (110) to transmit a data unit comprising at least two DRX command Medium Access Control (MAC) Control Elements (CEs) to the UE when the processor determined to make the UE use the long DRX cycle.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for a user equipment (UE) to operate in a wireless communication system, the method comprising:

receiving configuration information for a long discontinuous reception (DRX) cycle and a short DRX cycle from a network;

receiving a medium access control (MAC) protocol data unit (PDU) comprising at least one DRX command MAC control element (CE) from the network;

checking the number of DRX command MAC CEs that are present in the MAC PDU; and performing DRX operation, wherein a cycle of the DRX operation is determined depending on the checked number of DRX command MAC CEs.

2. The method of claim 1, wherein the cycle of the DRX operation is determined as the short DRX cycle if the MAC PDU comprises only one DRX command MAC CE, and the cycle of the DRX operation is determined as the long DRX cycle if the MAC PDU comprises two or more DRX command MAC CEs.

3. The method of claim 2, wherein the usage of the short DRX cycle comprises starting a DRX short cycle timer, wherein the DRX operation is performed by using the long DRX cycle after the DRX short cycle timer expires.

4. The method of claim 3, wherein, if the UE receives the MAC PDU while the short DRX cycle is used and if the MAC PDU comprises two or more DRX command MAC CEs, the UE uses the long DRX cycle even if the DRX short cycle timer does not expire yet.

5. A user equipment (UE) for operating in a wireless communication system, the UE comprising:

a Radio Frequency (RF) module; and a processor operably coupled with the RF module and configured to:

receive configuration information for a long discontinuous reception (DRX) cycle and a short DRX cycle from a network, receive a medium access control (MAC) protocol data unit (PDU) comprising at least one DRX command MAC control element (CE) from the network, check the number of DRX command MAC CEs that are present in the MAC PDU, and perform DRX operation, wherein a cycle of the DRX operation is determined depending on the checked number of DRX command MAC CEs.

6. The UE of claim 5, wherein the cycle of the DRX operation is determined as the short DRX cycle if the MAC PDU comprises only one DRX command MAC CE, and the cycle of the DRX operation is determined as the long DRX cycle if the MAC PDU comprises two or more DRX command MAC CEs.

7. The UE of claim 6, wherein the processor is further configured to start a DRX short cycle timer when the short DRX cycle is used, and wherein the DRX operation is performed by using the long DRX cycle after the DRX short cycle timer expires.

8. The UE of claim 7, wherein, if the UE receives the MAC PDU while the short DRX cycle is used and if the MAC PDU comprises two or more DRX command MAC CEs, the processor is further configured to use the long DRX cycle even if the DRX short cycle timer does not expire yet.

* * * * *